(12) United States Patent
Wu et al.

(10) Patent No.: US 11,553,460 B2
(45) Date of Patent: Jan. 10, 2023

(54) TRANSMIT AND RECEIVE SWITCHING FOR SIDELINK COMMUNICATIONS

(71) Applicant: QUALCOMM Incorporated, San Diego, CA (US)

(72) Inventors: Shuanshuan Wu, San Diego, CA (US); Kapil Gulati, Belle Mead, NJ (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/145,649

(22) Filed: Jan. 11, 2021

(65) Prior Publication Data

US 2022/0225277 A1 Jul. 14, 2022

(51) Int. Cl.
*H04W 56/00* (2009.01)
*H04W 72/02* (2009.01)
(Continued)

(52) U.S. Cl.
CPC ....... *H04W 72/02* (2013.01); *H04L 27/26025* (2021.01); *H04W 72/0446* (2013.01); *H04W 88/06* (2013.01); *H04W 92/18* (2013.01)

(58) Field of Classification Search
CPC . H04W 72/02; H04W 72/0446; H04W 88/06; H04W 92/18; H04L 27/26025
(Continued)

(56) References Cited

U.S. PATENT DOCUMENTS

2012/0014349 A1* 1/2012 Chung ................. H04B 7/0693
370/329
2014/0126432 A1 5/2014 Wang et al.
(Continued)

FOREIGN PATENT DOCUMENTS

WO WO-2015064770 A1 5/2015
WO WO-2016007957 A1 1/2016

OTHER PUBLICATIONS

Intel Corporation: "Sidelink Physical Structure for NR V2X Communication", 3GPP Draft, R1-1912203, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. Ran WG1, No. Reno, Nevada, USA, Nov. 18, 2019-Nov. 22, 2019, Nov. 9, 2019 (Nov. 9, 2019), XP051823280, pp. 1-34, Retrieved from the Internet: URL:https://ftp.3gpp.org/tsg_ran/WG1_RL1/TSGR1_99/Docs/R1-1912203.zip R1-1912203 Intel- V2X_SL_L1_Struct.docx [retrieved on Nov. 9, 2019] Proposal 21, p. 18, paragraph [0001] paragraph [0002] paragraph [0008].

(Continued)

*Primary Examiner* — Sai Ming Chan
(74) *Attorney, Agent, or Firm* — Holland & Hart LLP

(57) ABSTRACT

Methods, systems, and devices for wireless communications are described. The methods include determining a sidelink message to transmit to a second user equipment (UE) over a time resource of a sidelink connection between a first UE and the second UE, encoding at least a subset of time periods of the time resource according to a configuration that is based on a switching time for the second UE for switching from a receiving mode to a transmitting mode during reception of the sidelink message during at least the subset of time periods of the time resource, and transmitting the sidelink message to the second UE using a set of time periods of the time resource that includes the subset of time periods.

30 Claims, 12 Drawing Sheets

(51) Int. Cl.
*H04L 27/26* (2006.01)
*H04W 72/04* (2009.01)
*H04W 88/06* (2009.01)
*H04W 92/18* (2009.01)

(58) Field of Classification Search
USPC .......................................................... 370/329
See application file for complete search history.

(56) References Cited

U.S. PATENT DOCUMENTS

| | | | |
|---|---|---|---|
| 2020/0120514 A1* | 4/2020 | Wang | H04W 72/0453 |
| 2021/0050956 A1* | 2/2021 | Yeo | H04L 1/1822 |
| 2021/0127377 A1* | 4/2021 | Lee | H04W 4/40 |
| 2021/0160027 A1* | 5/2021 | Werner | H04B 7/0617 |
| 2022/0038943 A1* | 2/2022 | Hu | H04L 43/06 |

OTHER PUBLICATIONS

International Search Report and Written Opinion—PCT/US2021/061377—ISA/EPO—dated Mar. 15, 2022.
Zte: "Discussion on Short TTI with eV2X", 3GPP Draft, 3GPP TSG RAN WG1 Meeting #89, R1-1707777-6.2.3.3.2 Discussion on Short TTI with V2X, 3rd Generation Partnership Project (3GPP), Mobile Competence Centre, 650, Route Des Lucioles, F-06921 Sophia-Antipolis Cedex, France, vol. Ran WG1, No. Hangzhou, May 15, 2017-May 19, 2017, May 14, 2017 (May 14, 2017), XP051272980, 5 Pages, Retrieved from the Internet: URL:http://www.3gpp.org/ftp/Meetings_3GPP_SYNC/RAN1/Docs/ [retrieved on May 14, 2017] the whole document.

* cited by examiner

TRANSMIT AND RECEIVE SWITCHING FOR SIDELINK COMMUNICATIONS

FIELD OF TECHNOLOGY

The following relates to wireless communications, including transmit and receive switching for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, sidelink communication may include a gap between slots that allows a UE to switch from transmitting mode to receiving mode, or from receiving mode to transmitting mode. However, in some cases the gap may result in inefficient resource utilization and higher system latency.

SUMMARY

The described techniques relate to improved methods, systems, devices, and apparatuses that support transmit and receive switching for sidelink communications. Generally, the described techniques provide for a novel frame structure design (e.g., removing the physical gap between slots) that improves resource utilization in time division duplex (TDD) systems (e.g., sidelink communication systems, TDD cellular communication systems, etc.). For transmitting mode to receiving mode switches, and receiving mode to transmitting mode switches, the present techniques may specify UE behaviors to accommodate switching operations without the physical gap between slots.

A method for wireless communication at a first user equipment (UE) is described. The method may include determining a sidelink message to transmit to a second UE over a time resource of a sidelink connection between the first UE and the second UE, encoding at least a subset of time periods of the time resource according to a configuration that is based on a switching time for the second UE for switching from a receiving mode to a transmitting mode during reception of the sidelink message during at least the subset of time periods of the time resource, and transmitting the sidelink message to the second UE using a set of time periods of the time resource that includes the subset of time periods.

An apparatus for wireless communication at a first UE is described. The apparatus may include a processor, memory in electronic communication with the processor, and instructions stored in the memory. The instructions may be executable by the processor to cause the apparatus to determine a sidelink message to transmit to a second UE over a time resource of a sidelink connection between the first UE and the second UE, encode at least a subset of time periods of the time resource according to a configuration that is based on a switching time for the second UE for switching from a receiving mode to a transmitting mode during reception of the sidelink message during at least the subset of time periods of the time resource, and transmit the sidelink message to the second UE using a set of time periods of the time resource that includes the subset of time periods.

Another apparatus for wireless communication at a first UE is described. The apparatus may include means for determining a sidelink message to transmit to a second UE over a time resource of a sidelink connection between the first UE and the second UE, means for encoding at least a subset of time periods of the time resource according to a configuration that is based on a switching time for the second UE for switching from a receiving mode to a transmitting mode during reception of the sidelink message during at least the subset of time periods of the time resource, and means for transmitting the sidelink message to the second UE using a set of time periods of the time resource that includes the subset of time periods.

A non-transitory computer-readable medium storing code for wireless communication at a first UE is described. The code may include instructions executable by a processor to determine a sidelink message to transmit to a second UE over a time resource of a sidelink connection between the first UE and the second UE, encode at least a subset of time periods of the time resource according to a configuration that is based on a switching time for the second UE for switching from a receiving mode to a transmitting mode during reception of the sidelink message during at least the subset of time periods of the time resource, and transmit the sidelink message to the second UE using a set of time periods of the time resource that includes the subset of time periods.

In some examples of the method, apparatuses, and non-transitory computer-readable medium described herein, encoding at least the subset of time periods of the time resource according to the configuration may include operations, features, means, or instructions for mapping modulation symbols to resource elements of the subset of time periods according to a comb mapping pattern.

In some examples of the method, apparatuses, and non-transitory computer-readable medium described herein, encoding at least the subset of time periods of the time resource according to the configuration may include operations, features, means, or instructions for configuring at least the subset of time periods with parity bits, or with repeating binary zeros, or with repeating binary ones, or with a configured sequence of bits.

In some examples of the method, apparatuses, and non-transitory computer-readable medium described herein, encoding at least the subset of time periods of the time resource according to the configuration may include operations, features, means, or instructions for using a first subcarrier spacing for transmission of at least a first time period of the time resource and using a second subcarrier spacing for transmission of at least the subset of time periods, where the second subcarrier spacing may be different from the first subcarrier spacing.

Some examples of the method, apparatuses, and non-transitory computer-readable medium described herein may further include operations, features, means, or instructions for switching from the transmitting mode to the receiving mode during a first portion of a first time period of a second time resource directly subsequent the time resource and receiving a transmission during a second portion of the first time period of the second time resource that occurs after the first portion of the first time period of the second time resource.

Some examples of the method, apparatuses, and non-transitory computer-readable medium described herein may further include operations, features, means, or instructions for receiving an indication of the configuration from a base station.

Some examples of the method, apparatuses, and non-transitory computer-readable medium described herein may further include operations, features, means, or instructions for transmitting a message to the second UE that indicates the configuration received from the base station.

In some examples of the method, apparatuses, and non-transitory computer-readable medium described herein, the time resource includes a first sidelink slot, and the subset of time periods includes one or more orthogonal frequency division multiplexing symbols.

A method for wireless communication at a second UE is described. The method may include determining a sidelink message is to be transmitted from a first UE to the second UE over a time resource, decoding at least a subset of time periods of the time resource according to a configuration that is based on a switching time for the second UE for switching from a receiving mode to a transmitting mode during reception of the sidelink message during at least the subset of time periods of the time resource, and switching from the receiving mode to the transmitting mode during at least the subset of time periods of the time resource to transmit a second sidelink message during a second time resource subsequent to the time resource.

An apparatus for wireless communication at a second UE is described. The apparatus may include a processor, memory in electronic communication with the processor, and instructions stored in the memory. The instructions may be executable by the processor to cause the apparatus to determine a sidelink message is to be transmitted from a first UE to the second UE over a time resource, decode at least a subset of time periods of the time resource according to a configuration that is based on a switching time for the second UE for switching from a receiving mode to a transmitting mode during reception of the sidelink message during at least the subset of time periods of the time resource, and switch from the receiving mode to the transmitting mode during at least the subset of time periods of the time resource to transmit a second sidelink message during a second time resource subsequent to the time resource.

Another apparatus for wireless communication at a second UE is described. The apparatus may include means for determining a sidelink message is to be transmitted from a first UE to the second UE over a time resource, means for decoding at least a subset of time periods of the time resource according to a configuration that is based on a switching time for the second UE for switching from a receiving mode to a transmitting mode during reception of the sidelink message during at least the subset of time periods of the time resource, and means for switching from the receiving mode to the transmitting mode during at least the subset of time periods of the time resource to transmit a second sidelink message during a second time resource subsequent to the time resource.

A non-transitory computer-readable medium storing code for wireless communication at a second UE is described. The code may include instructions executable by a processor to determine a sidelink message is to be transmitted from a first UE to the second UE over a time resource, decode at least a subset of time periods of the time resource according to a configuration that is based on a switching time for the second UE for switching from a receiving mode to a transmitting mode during reception of the sidelink message during at least the subset of time periods of the time resource, and switch from the receiving mode to the transmitting mode during at least the subset of time periods of the time resource to transmit a second sidelink message during a second time resource subsequent to the time resource.

In some examples of the method, apparatuses, and non-transitory computer-readable medium described herein, decoding at least the subset of time periods may include operations, features, means, or instructions for demapping modulation symbols from resource elements of the subset of time periods according to a comb mapping pattern.

In some examples of the method, apparatuses, and non-transitory computer-readable medium described herein, decoding at least the subset of time periods may include operations, features, means, or instructions for determining the subset of time periods includes parity bits, or repeating binary zeros, or repeating binary ones, or a configured sequence of bits.

In some examples of the method, apparatuses, and non-transitory computer-readable medium described herein, decoding at least the subset of time periods may include operations, features, means, or instructions for determining a first subcarrier spacing used for transmission of at least a first time period of the time resource and determining a second subcarrier spacing used for transmission of at least the subset of time periods, where the second subcarrier spacing may be different from the first subcarrier spacing.

Some examples of the method, apparatuses, and non-transitory computer-readable medium described herein may further include operations, features, means, or instructions for receiving an indication of the configuration from a base station.

Some examples of the method, apparatuses, and non-transitory computer-readable medium described herein may further include operations, features, means, or instructions for receiving a message from the first UE that indicates the configuration.

In some examples of the method, apparatuses, and non-transitory computer-readable medium described herein, the time resource includes a first sidelink slot, and the subset of time periods includes one or more orthogonal frequency division multiplexing symbols.

DETAILED DESCRIPTION

Figure 1:
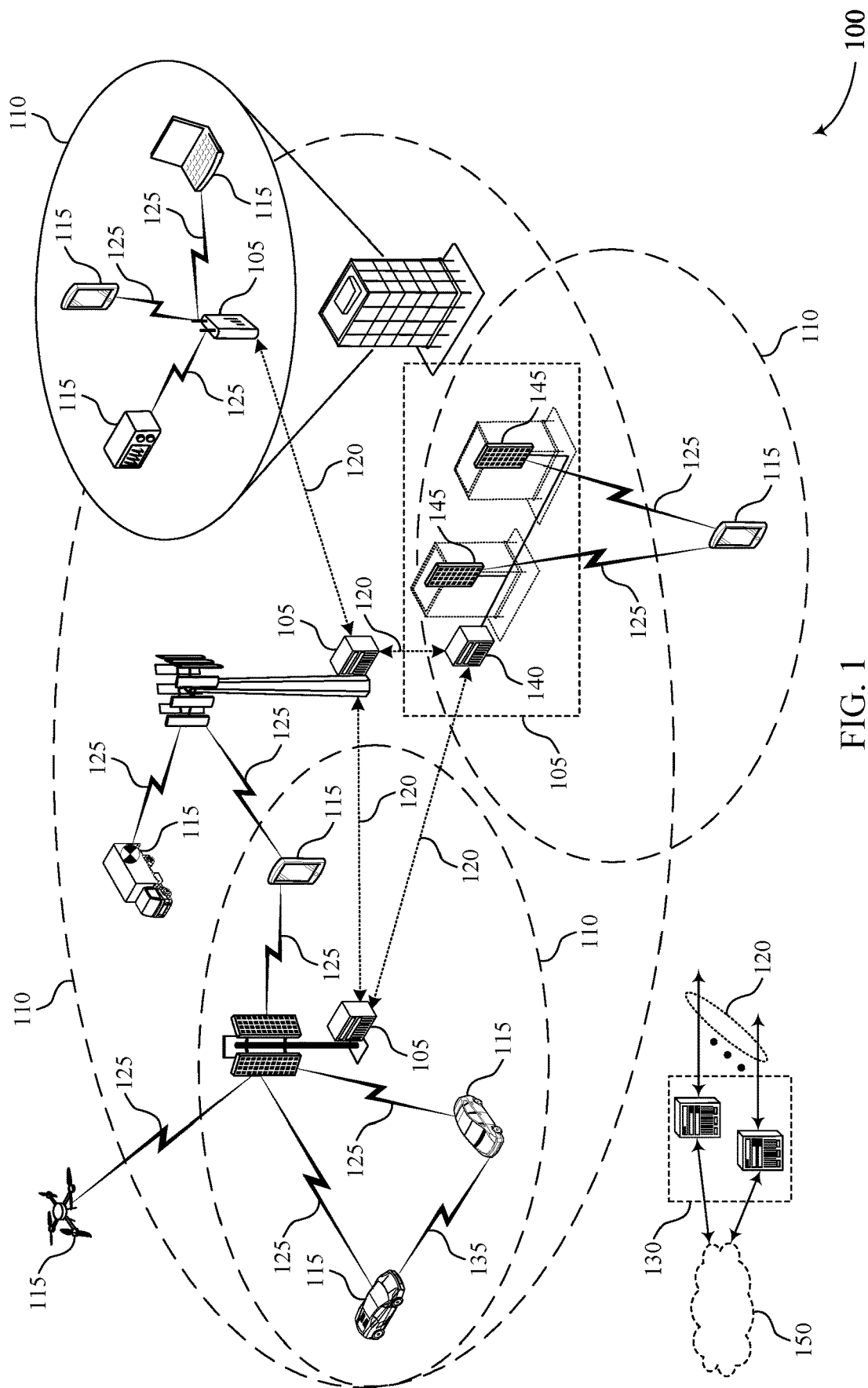
FIG. 1 illustrates an example of a wireless communications system that supports transmit and receive switching for sidelink communications in accordance with aspects of the present disclosure.

The present techniques include transmit and receive switching for sidelink communications. The present techniques provide improvements to operations associated with transmit and receive switching for sidelink communications.

Sidelink communication may include a gap (e.g., a gap between sidelink transmissions) that allows a UE to switch from transmitting mode to receiving mode or from receiving mode to transmitting mode. However, this gap may present multiple problems, including inefficient resource utilization. For example, the gap may result in 1 or 2 orthogonal frequency division multiplexing (OFDM) symbols being unusable over a given set of OFDM symbols (e.g., a set of 14 OFDM symbols). In systems that use an unlicensed spectrum (e.g., shared with other wireless technologies such as Wi-Fi, etc.), the gap may result in loss of the medium. For example, if discontinuous transmission occurs (e.g., when a transmission gap occurs), a device may stop transmitting to perform a listen before talk operation (e.g., energy-detection based channel sensing) following the gap when the gap is larger than a threshold (e.g., greater than 16 microseconds), resulting in loss of the medium (e.g., loss of access which may require a new access procedure).

The present techniques provide a frame structure design (e.g., removing the physical gap between slots) that improves resource utilization in time division duplex (TDD) systems (e.g., sidelink communication systems, TDD cellular communication systems, etc.). For switches from receiving mode to transmitting mode and transmitting mode to receiving mode, the present techniques may specify UE behaviors to accommodate switching operations without the physical gap between slots.

For transmitting mode to receiving mode switching, a first UE operating in a transmitting mode may transmit a transmission to a second UE operating in a receiving mode. The first UE may transmit the transmission during a first time period, then switch over to receiving mode after the first time period. Once the switch to receiving mode is complete, the first UE may receive a transmission from a second UE during a second time period. However, without the physical gap the first UE may initiate and complete the transmitting mode to receiving mode switch during a first portion of the first symbol of the second time period, resulting in the first UE losing a first portion of the first symbol from the second UE.

For receiving mode to transmitting mode switching, a first UE operating in a receiving mode may receive a transmission from a second UE operating in a transmitting mode. The first UE may receive the transmission during a first time period, then switch over to transmitting mode after the first time period. Once the switch to transmitting mode is complete, the first UE may transmit a transmission to the second UE during a second time period. However, without the physical gap the first UE may initiate and complete the receiving mode to transmitting mode switch during a last portion of the last symbol of the first time period, resulting in the first UE losing a last portion of the last symbol from the second UE.

The techniques described herein mitigate the first UE losing a first portion of the first symbol from the second UE during transmitting mode to receiving mode switching. The techniques described herein may also mitigate the first UE losing a portion (e.g., a last portion) of the last symbol from the second UE during receiving mode to transmitting mode switching.

Aspects of the subject matter described herein may be implemented to realize one or more advantages. The described techniques may result in improving the spectral efficiency in sidelink communications (e.g., based on removal of the physical gap), avoiding multiple retransmissions and failed transmissions, decreasing system latency, improving the reliability of decoding procedures for uplink transmissions at a base station, and improving user the experience.

Aspects of the disclosure are initially described in the context of wireless communications systems. Aspects of the disclosure are further illustrated by and described with reference to environments of wireless communications systems and process flows. Aspects of the disclosure are further illustrated by and described with reference to apparatus diagrams, system diagrams, and flowcharts that relate to transmit and receive switching for sidelink communications.

FIG. 1 illustrates an example of a wireless communications system 100 that supports transmit and receive switching for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA).

Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a first UE 115 may determine that there is a sidelink message to transmit to a second UE 115. The first UE 115 may determine that the sidelink message is to be transmitted over a time resource (e.g., of a sidelink connection) between the first UE 115 and the second UE 115. In some cases, the first UE 115 may encode a first portion of the sidelink message according to a first encoding configuration and encode a second portion of the sidelink message according to a second encoding configuration. In some cases, the second encoding configuration may be based on a switching time for the second UE 115 to switch from a receiving mode to a transmitting mode during reception of the sidelink message during at least a subset of time periods (e.g., at least a last time period) of the time resource. In some cases, the first UE 115 may transmit the sidelink message to the second UE 115 using a set of time periods of the time resource that includes the subset of time periods.

Figure 2:
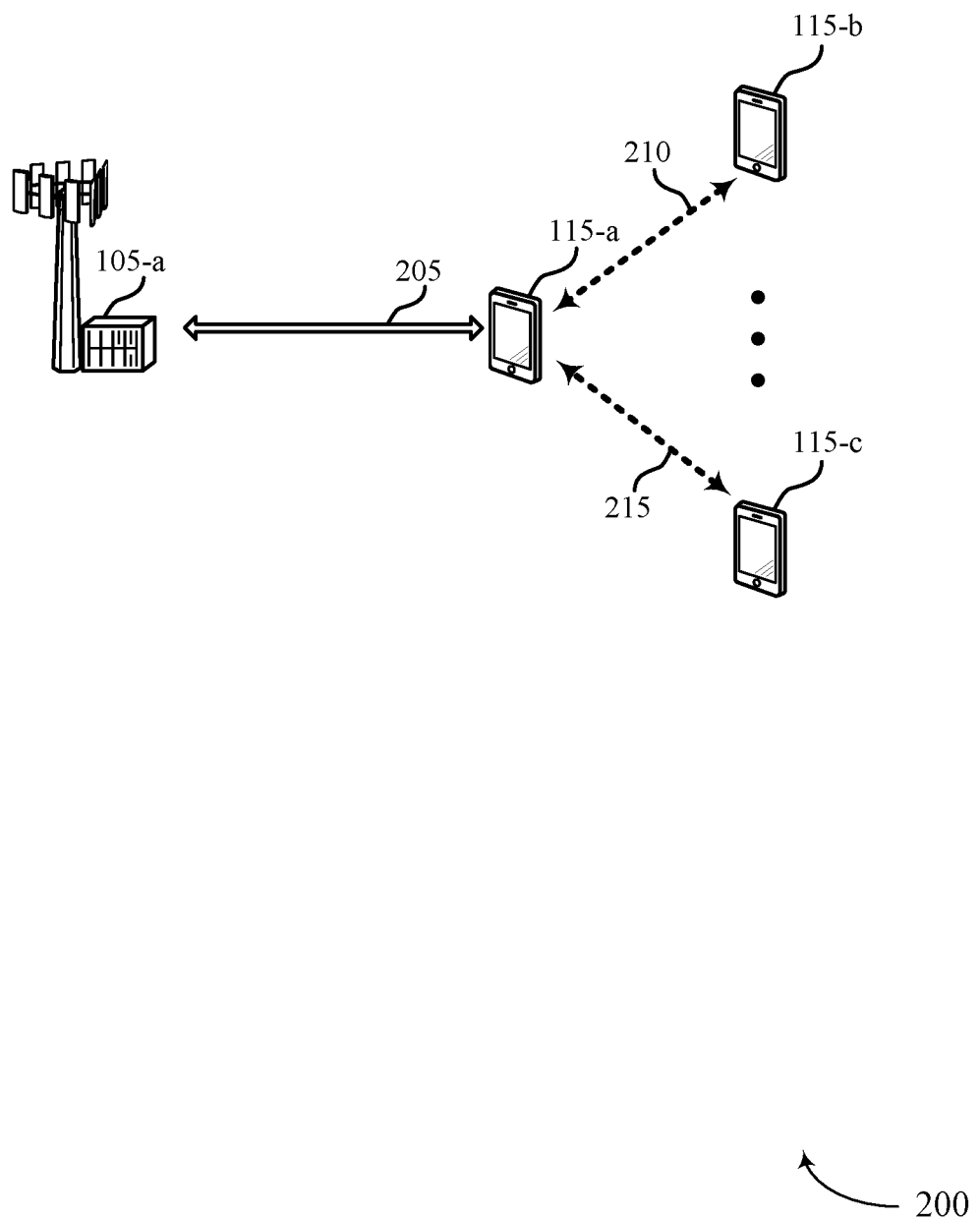
FIG. 2 illustrates an example of a wireless communications system that supports transmit and receive switching for sidelink communications in accordance with aspects of the present disclosure.

FIG. 2 illustrates an example of a wireless communications system 200 that supports transmit and receive switching for sidelink communications in accordance with aspects of the present disclosure.

As illustrated, wireless communications system 200 may include UE 115-a (e.g., sidelink hub UE), UE 115-b (e.g., a first sidelink peripheral UE), UE 115-c (e.g., a second sidelink peripheral UE), and optionally base station 105-a (e.g., UE 115-a, UE 115-b, and UE 115-c may communicate over a sidelink connection without relying on scheduling or control information from base station 105-a), any of which may be an example of a UE 115 or a base station 105, respectively, as described above with reference to FIG. 1. Wireless communications system 200 may include a link 205 between base station 105-a and UE 115-a. Wireless communications system 200 may also include a sidelink 210 between UE 115-a and UE 115-b and a sidelink 215 between UE 115-a and UE 115-c. In some examples, link 205 may include a downlink (e.g., forward link) and an uplink (e.g., reverse link). In some examples, base station 105-a may use the downlink of link 205 to convey control and/or data information to UE 115-a. And UE 115-a may use the uplink of link 205 to convey control or data information to base station 105-a. In some cases, the downlink of link 205 may use different time and/or frequency resources than the uplink of link 205.

In some cases, UEs 115-a, 115-b, and 115-c may use frame structure design that removes the physical gap between slots when switching from transmitting mode to receiving mode, or when switching from receiving mode to transmitting mode. For receiving to transmitting mode switches and transmitting to receiving mode switches, the present techniques include configurations for UEs 115-a, 115-b, and 115-c to accommodate switching operations without the physical gap between slots.

For transmitting to receiving switching, UE 115-a operating in a transmitting mode may transmit a transmission to UE 115-b operating in a receiving mode. The UE 115-a may transmit the transmission during a first time period, then switch over to receiving mode after the first time period. Once the switch to receiving mode is complete, the UE 115-a may receive a transmission from UE 115-b during a second time period. However, without the physical gap UE 115-a may initiate and complete the transmitting to receiving switch during a first portion of the first symbol of the second time period, resulting in UE 115-a losing a first portion of the first symbol from UE 115-b.

For receiving to transmitting switching, UE 115-a operating in a receiving mode may receive a transmission from UE 115-b operating in a transmitting mode. The UE 115-a may receive the transmission during a first time period, then switch over to transmitting mode after the first time period. Once the switch to transmitting mode is complete, the UE 115-a may transmit a transmission to UE 115-b during a second time period. However, without the physical gap UE 115-*a* may initiate and complete the receiving to transmitting switch during a last portion of the last symbol of the first time period, resulting in UE 115-*a* losing a last portion of the last symbol from UE 115-*b*.

The frame structure design mitigates the first UE losing a first portion of the first symbol from the second UE during transmitting to receiving switching. In some cases, the first OFDM symbol in a slot or a transmission may be used for automatic gain control (AGC) training. In some cases, the AGC symbol of a transmission may include redundant information or information that is irrelevant to UE 115-*a* receiving and decoding the rest of the transmission. In some cases, the AGC symbol may be a copy of the next symbol of the transmission. Accordingly, UE 115-*a* may discard the first symbol from UE 115-*b* during transmitting to receiving switching.

The frame structure design also mitigates UE 115-*a* losing a last portion of the last symbol from UE 115-*a* during receiving to transmitting switching. In some cases, to mitigate UE 115-*a* losing the last portion of the last symbol, UE 115-*b* may be configured to transmit relatively less important information during the last symbol (e.g., parity bits) instead of data bits or control information. In some cases, UE 115-*b* may be configured to use bit interleaving during the last symbol. In some cases, UE 115-*b* may be configured to use resource element mapping (e.g., comb-N resource element mapping where symbols are mapped to every N-th resource element) to mitigate UE 115-*a* losing the last portion of the last symbol. In some cases, UE 115-*b* may use the last symbol for data transmission or for other signals (e.g., reference signal for demodulation or channel measurement, etc.). In some cases, UE 115-*b* may modify the subcarrier spacing of the last symbol to mitigate UE 115-*a* losing the last portion of the last symbol. For example, UE 115-*b* may configure the last symbol with twice the subcarrier spacing as the rest of the symbols of a given slot (e.g., 60 kHz for the last symbol and 30 kHz for the rest of the symbols). Since twice the subcarrier spacing means half the symbol duration, the original last symbol may be repeated in the last symbol, thus mitigating the loss of the last portion of the last symbol. Thus, the frame structure design and associated configurations enable UE 115-*a* to recover the signal after losing the last portion of the last symbol.

Aspects of the subject matter described herein may be implemented to realize one or more advantages. The frame structure design improves resource utilization in time division duplex (TDD) systems (e.g., sidelink communication systems, TDD cellular communication systems, etc.). Also, the described techniques result in avoiding multiple retransmissions and failed transmissions, decreasing system latency, improving the reliability of decoding procedures for uplink transmissions at a base station, and improving user the experience.

Figure 3:
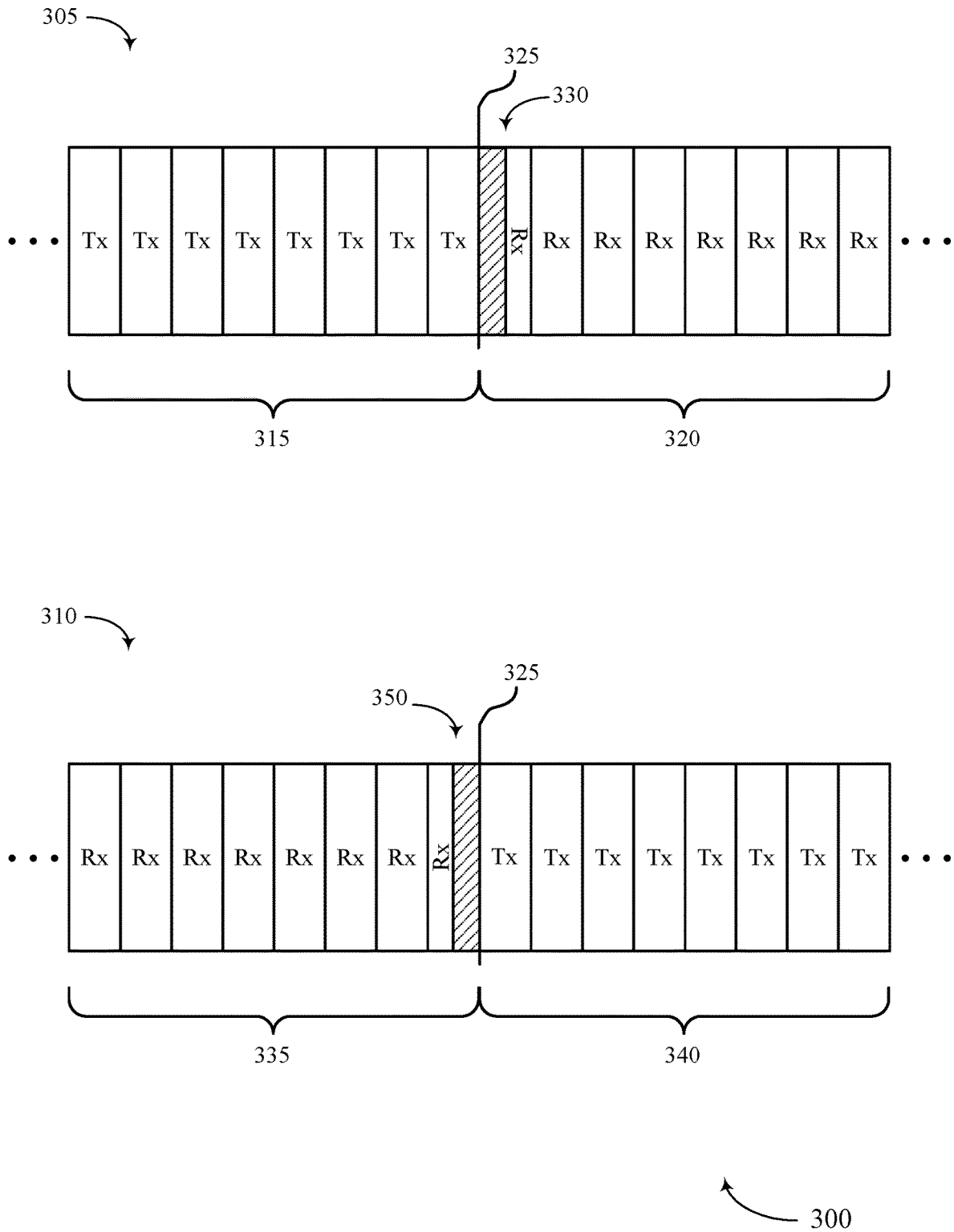
FIG. 3 illustrates an example of frame structures that support transmit and receive switching for sidelink communications in accordance with aspects of the present disclosure.

FIG. 3 illustrates an example of frame structures 300 that support transmit and receive switching for sidelink communications in accordance with aspects of the present disclosure.

As illustrated, the frame structures 300 depict a frame structure 305 for a first time period 315 (e.g., last eight symbols of first time period 315) and a second time period 320 (e.g., first eight symbols of second time period 320) from the perspective of a first UE operating in a transmitting mode. During first time period 315 the first UE may transmit symbols to a second UE (e.g., via sidelink communications).

As shown, the frame structure 305 may include a boundary 325 (e.g., a slot boundary or a boundary between transmit resources and receive resources) without a physical gap. At the boundary 325 the first UE may switch from transmitting mode to receiving mode. Because the frame structure 305 is configured without the physical gap, the first UE may lose at least a portion of a first symbol 330 of the second time period 320. However, in some cases, the first OFDM symbol in the first symbol 330 of the second time period 320 may be used for automatic gain control (AGC) training. In some cases, the AGC symbol of a transmission may include redundant information or information that is irrelevant to the first UE receiving and decoding the rest of the transmission. In some cases, the AGC symbol may be a copy of the next symbol of the transmission. Accordingly, even if the first UE does not receive the first symbol 330 from the second UE during the switch from transmitting mode to receiving mode, the first UE is able to decode the next symbol, which may be a copy of the first symbol 330.

As illustrated, the frame structures 300 also depict a frame structure 310 for a first time period 335 (e.g., last eight symbols of first time period 335) and a second time period 340 (e.g., first eight symbols of second time period 340) from the perspective of the second UE operating in a receiving mode. During first time period 335 the second UE may receive via sidelink communications symbols from the first UE or another UE. In some cases, the frame structure 310 may align in time with the frame structure 305.

As shown, the frame structure 310 may include a boundary 325 (e.g., a slot boundary) without a physical gap. At the boundary 325 the second UE may switch from receiving mode to transmitting mode. Because the frame structure 310 is configured without the physical gap, the second UE may lose at least a portion of the last symbol 350 of the first time period 335. The frame structure 310 and associated UE configurations may mitigate the second UE, during receiving mode to transmitting mode switching, losing a last portion of the last symbol 350 from the first UE. In some cases, to mitigate the second UE losing the last portion of the last symbol the first UE may be configured transmitting relatively less important information during the last symbol (e.g., parity bits) instead of data bits or control information. In some cases, the first UE may use bit interleaving during the last symbol. In some cases, the first UE may use resource element mapping (e.g., comb-N resource element mapping where symbols are mapped to every N-th resource element) to mitigate the second UE losing the last portion of the last symbol. For example, the first UE may use comb-2 mapping where modulation symbols may be mapped to every other resource element in the last symbol. In some cases, comb-2 mapping results in a repetition of the signals in time domain. Thus, the second UE would be enabled by the comb-2 mapping to recover the signal after losing the last portion of the last symbol. In some cases, the first UE may use the last symbol for data transmission or for other signals (e.g., reference signal for demodulation or channel measurement, etc.). In some cases, the first UE may modify the subcarrier spacing of the last symbol to mitigate the second UE losing the last portion of the last symbol. For example, the last symbol may be configured with twice the subcarrier spacing as the rest of the symbols of a given slot (e.g., 60 kHz for the last symbol and 30 kHz for the rest of the symbols). Since twice the subcarrier spacing means half the symbol duration, the original last symbol may be repeated in the last symbol, thus mitigating the second UE losing the last portion of the last symbol.

Figure 4:
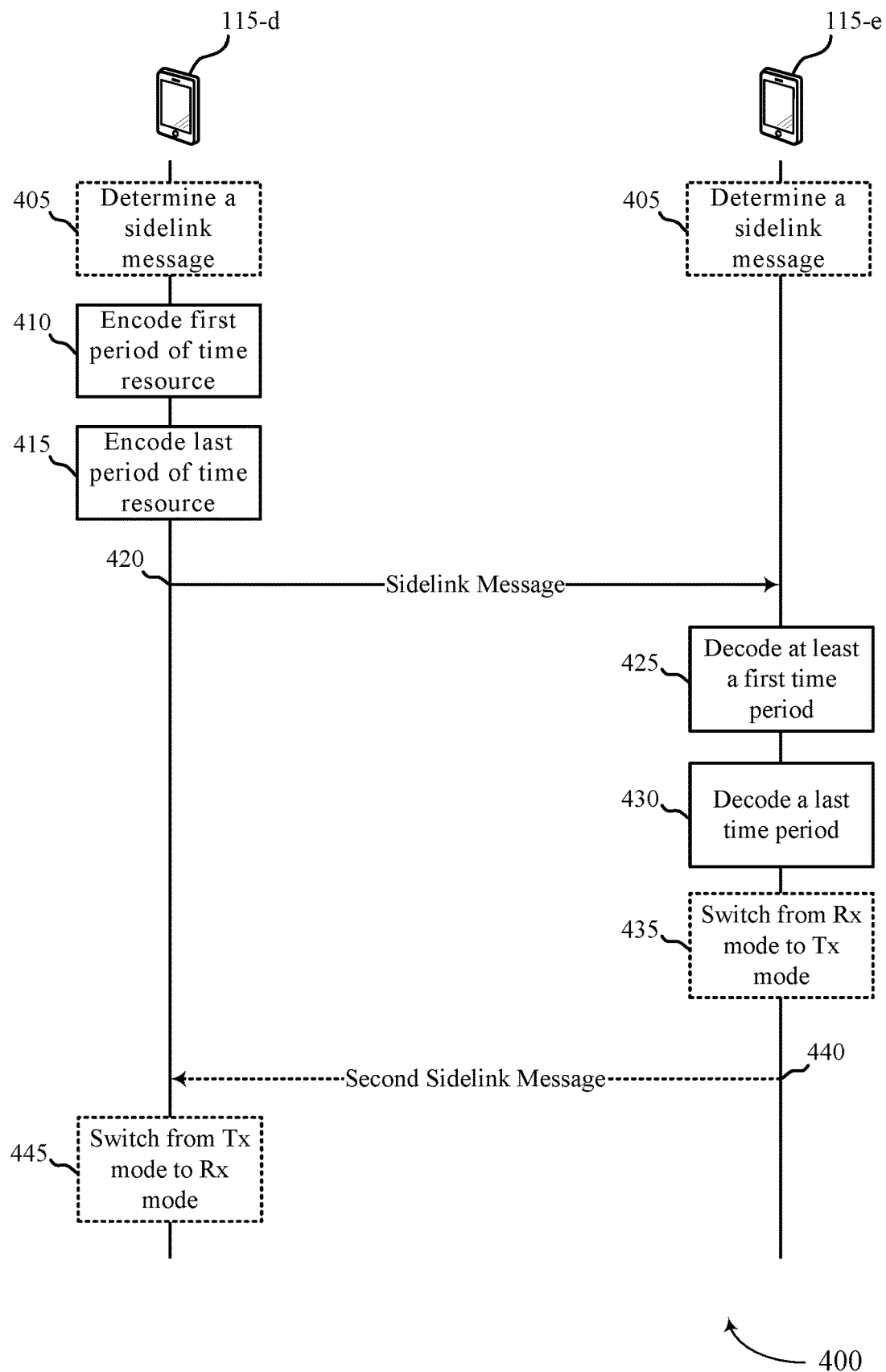
FIG. 4 illustrates an example of a process flow that supports transmit and receive switching for sidelink communications in accordance with aspects of the present disclosure.

FIG. 4 illustrates an example of a process flow 400 that supports transmit and receive switching for sidelink communications in accordance with aspects of the present disclosure.

At 405, UE 115-*d* may optionally determine a sidelink message to transmit to UE 115-*e* over a first time resource. In some cases, UE 115-*e* may optionally determine a sidelink message to be transmitted to UE 115-*e* over a first time resource. In some cases, both UE 115-*d* and UE 115-*e* may determine the sidelink message. In some cases, the first time resource may be associated with a sidelink connection between UE 115-*d* and UE 115-*e*. It is noted that the sidelink message may be transmitted via unicast, groupcast, or broadcast. When UE 115-*d* or another UE transmits the sidelink message via unicast, UE 115-*e* may determine that UE 115-*d* or the other UE transmitted the sidelink message. When the sidelink message is transmitted via broadcast, the transmitting device may be indeterminable.

At 410, UE 115-*d* may encode at least a first time period of the first time resource based on a first encoding configuration.

At 415, UE 115-*d* may encode at least a last time period of the first time resource in accordance with a second encoding configuration that is different from the first encoding configuration. In some cases, UE 115-*d* may encode at least the last time period of the first time resource in accordance with a configuration (e.g., second encoding configuration) that is based on a switching time of UE 115-*e*. The switching time may include UE 115-*e* switching from a receiving mode to a transmitting mode during reception of the sidelink message during at least the last time period of the first time resource.

At 420, UE 115-*d* may transmit the sidelink message to UE 115-*e*. In some cases, UE 115-*d* may use all of the time periods of the first time resource (e.g., without a gap time period) to transmit the sidelink message to UE 115-*e*.

At 425, UE 115-*e* may decode a first portion of the sidelink message transmitted at least over the first time period. In some cases, UE 115-*e* may decode the first portion of the sidelink message in accordance with the first encoding configuration.

At 430, UE 115-*e* may decode a second portion of the sidelink message transmitted at least over the last time period. In some cases, UE 115-*e* may decode the second portion of the sidelink message in accordance with the second encoding configuration.

At 435, UE 115-*e* may optionally switch from a receiving mode to a transmitting mode during at least the last time period of the first time resource. The switching may be optional because switching may be performed when the UE 115-*e* determines that it will be switching to a different mode in a second time resource (e.g., from receiving mode to transmitting mode). When UE 115-*e* determines that it will remain in the same mode (e.g., remain in receiving mode in the second time resource), UE 115-*e* does not perform the switch, but remains in the current mode to enable UE 115-*e* to receive all of the information in the last time period of the first time resource slot. In some cases, UE 115-*e* may receive a portion of the sidelink message (e.g., a last portion or end portion of the sidelink message) over a first portion of the last time period of the first time resource and then switch from receiving mode to transmitting mode during a last portion of the last time period of the first time resource.

At 440, UE 115-*e* may transmit to UE 115-*d* a second sidelink message during a second time resource subsequent to the first time resource.

At 445, UE 115-*d* may optionally switch from a transmitting mode to a receiving mode during at least the last time period of the first time resource. In some cases, UE 115-*e* may switch from transmitting mode to receiving mode during a first portion of the first time period (e.g., initial time period) of the second time resource, and then UE 115-*d* may receive a portion of the second sidelink message (e.g., an initial portion or starting portion of the second sidelink message) over a second portion of the first time period of the second time resource. In some cases, after UE 115-*d* switches from transmitting mode to receiving mode, UE 115-*d* may receive the remainder of the second sidelink message.

Figure 5:
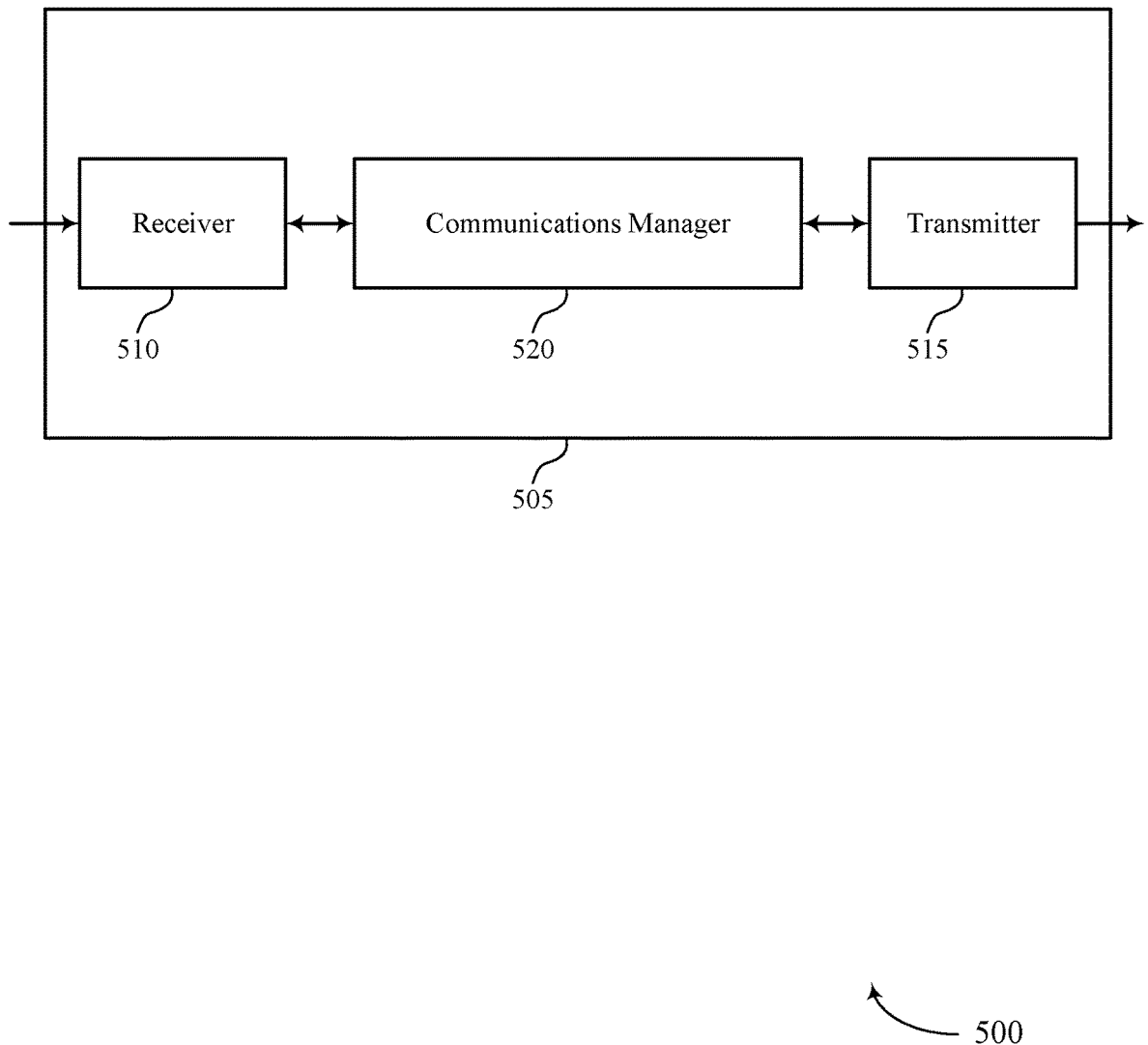
FIGS. 5 and 6 show block diagrams of devices that support transmit and receive switching for sidelink communications in accordance with aspects of the present disclosure.

FIG. 5 shows a block diagram 500 of a device 505 that supports transmit and receive switching for sidelink communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to transmit and receive switching for sidelink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to transmit and receive switching for sidelink communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of transmit and receive switching for sidelink communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for determining a sidelink message to transmit to a second UE over a time resource of a sidelink connection between the first UE and the second UE. The communications manager 520 may be configured as or otherwise support a means for encoding at least a subset of time periods of the time resource according to a configuration that is based on a switching time for the second UE for switching from a receiving mode to a transmitting mode during reception of the sidelink message during at least the subset of time periods of the time resource. The communications manager 520 may be configured as or otherwise support a means for transmitting the sidelink message to the second UE using a set of time periods of the time resource that includes the subset of time periods.

Additionally or alternatively, the communications manager 520 may support wireless communication at a second UE in accordance with examples as disclosed herein. For example, the communications manager 520 may be configured as or otherwise support a means for determining a sidelink message is to be transmitted from a first UE to the second UE over a time resource. The communications manager 520 may be configured as or otherwise support a means for decoding at least a subset of time periods of the time resource according to a configuration that is based on a switching time for the second UE for switching from a receiving mode to a transmitting mode during reception of the sidelink message during at least the subset of time periods of the time resource. The communications manager 520 may be configured as or otherwise support a means for switching from the receiving mode to the transmitting mode during at least the subset of time periods of the time resource to transmit a second sidelink message during a second time resource subsequent to the time resource.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for avoiding multiple retransmissions and failed transmissions, decreasing system latency, improving the reliability of decoding procedures for uplink transmissions at a base station, and improving user the experience.

Figure 6:
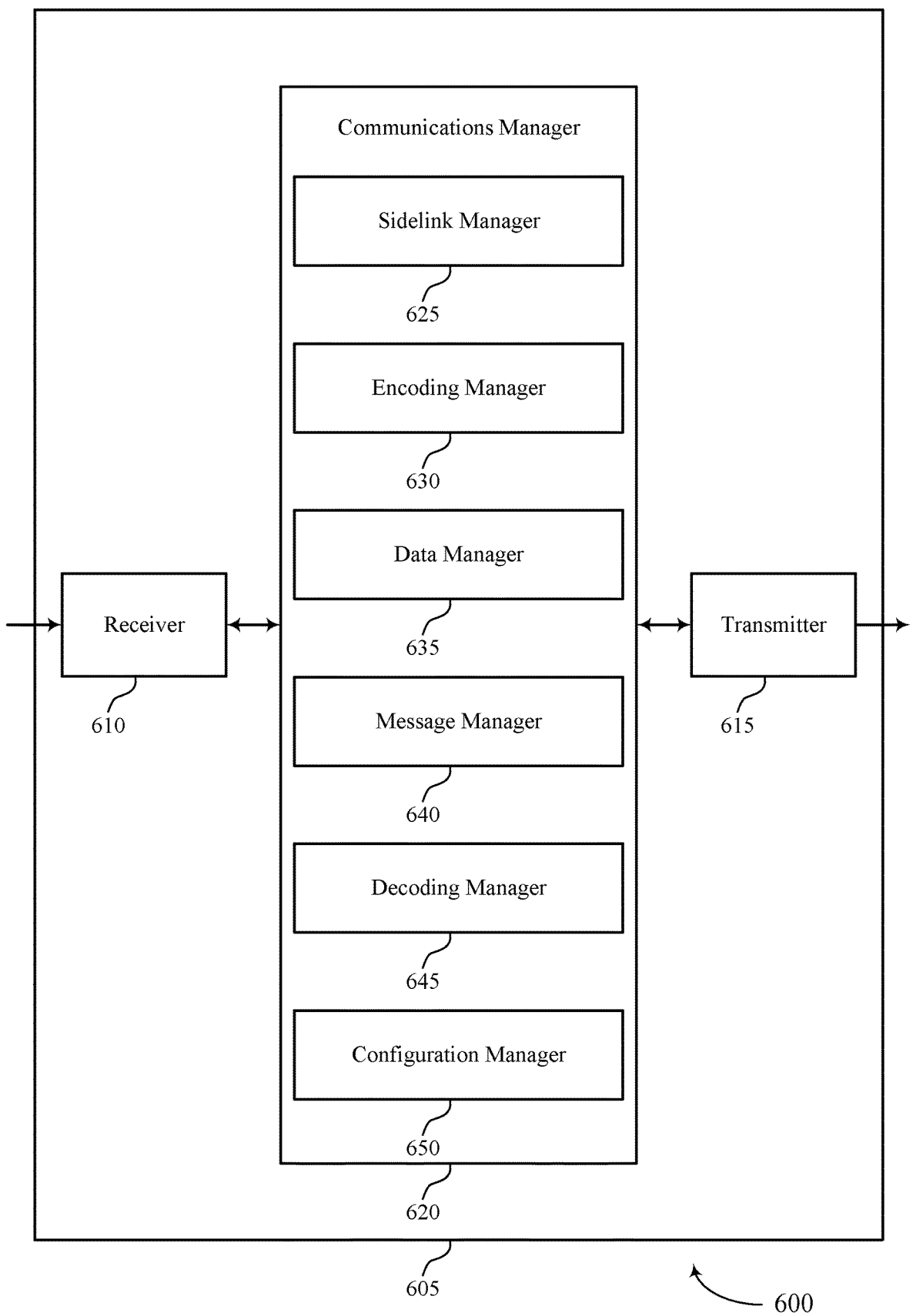

FIG. 6 shows a block diagram 600 of a device 605 that supports transmit and receive switching for sidelink communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to transmit and receive switching for sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to transmit and receive switching for sidelink communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of transmit and receive switching for sidelink communications as described herein. For example, the communications manager 620 may include a sidelink manager 625, an encoding manager 630, a data manager 635, a message manager 640, a decoding manager 645, a configuration manager 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The sidelink manager 625 may be configured as or otherwise support a means for determining a sidelink message to transmit to a second UE over a time resource of a sidelink connection between the first UE and the second UE. The encoding manager 630 may be configured as or otherwise support a means for encoding at least a subset of time periods of the time resource according to a configuration that is based on a switching time for the second UE for switching from a receiving mode to a transmitting mode during reception of the sidelink message during at least the subset of time periods of the time resource. The data manager 635 may be configured as or otherwise support a means for transmitting the sidelink message to the second UE using a set of time periods of the time resource that includes the subset of time periods.

Additionally or alternatively, the communications manager 620 may support wireless communication at a second UE in accordance with examples as disclosed herein. The message manager 640 may be configured as or otherwise support a means for determining a sidelink message is to be transmitted from a first UE to the second UE over a time resource. The decoding manager 645 may be configured as or otherwise support a means for decoding at least a subset of time periods of the time resource according to a configuration that is based on a switching time for the second UE for switching from a receiving mode to a transmitting mode during reception of the sidelink message during at least the subset of time periods of the time resource. The configuration manager 650 may be configured as or otherwise support a means for switching from the receiving mode to the transmitting mode during at least the subset of time periods of the time resource to transmit a second sidelink message during a second time resource subsequent to the time resource.

Figure 7:
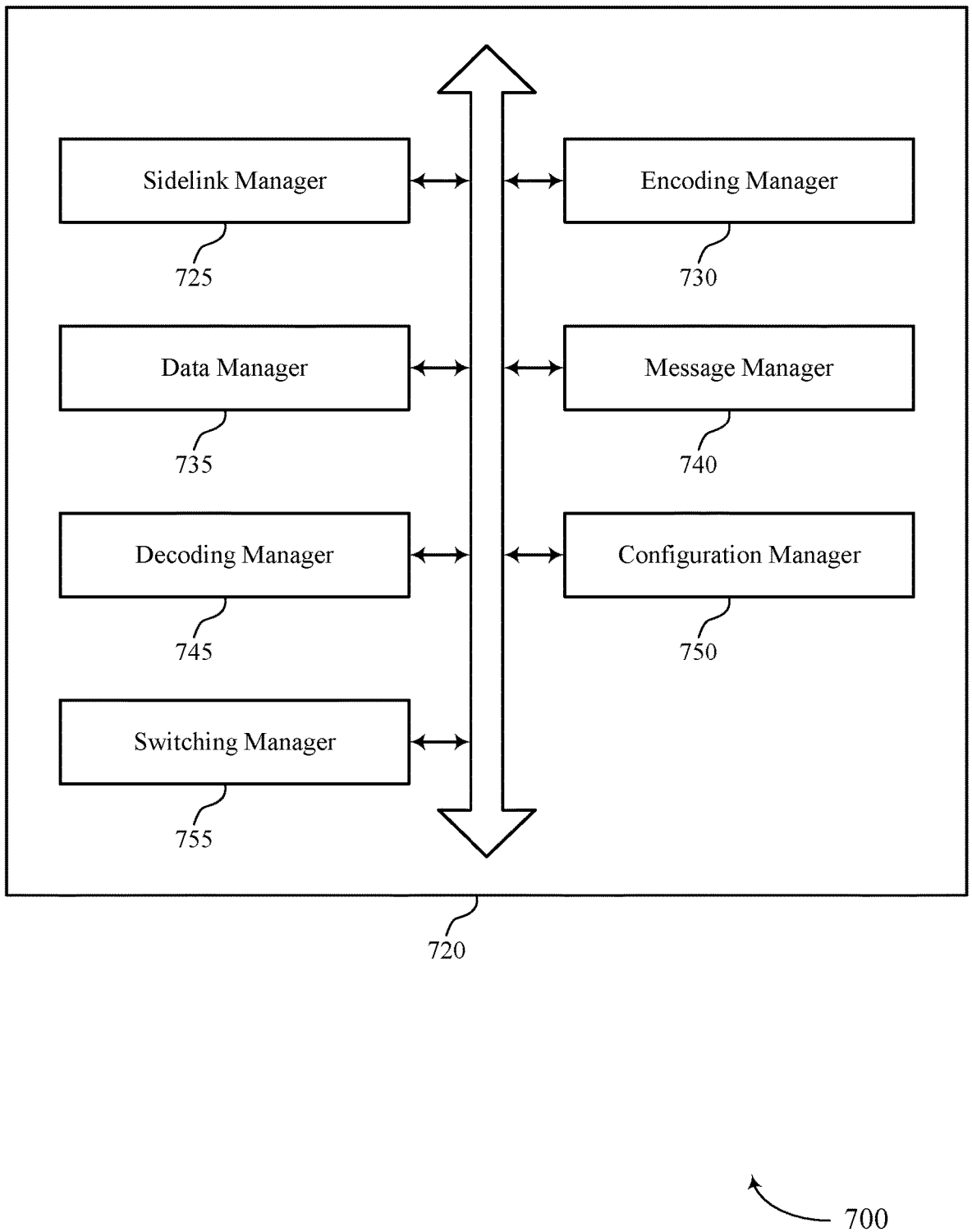
FIG. 7 shows a block diagram of a communications manager that supports transmit and receive switching for sidelink communications in accordance with aspects of the present disclosure.

FIG. 7 shows a block diagram 700 of a communications manager 720 that supports transmit and receive switching for sidelink communications in accordance with aspects of the present disclosure. The communications manager 720 may be an example of aspects of a communications manager 520, a communications manager 620, or both, as described herein. The communications manager 720, or various components thereof, may be an example of means for performing various aspects of transmit and receive switching for sidelink communications as described herein. For example, the communications manager 720 may include a sidelink manager 725, an encoding manager 730, a data manager 735, a message manager 740, a decoding manager 745, a configuration manager 750, a switching manager 755, or any combination thereof. Each of these components may communicate, directly or indirectly, with one another (e.g., via one or more buses).

The communications manager 720 may support wireless communication at a first UE in accordance with examples as disclosed herein. The sidelink manager 725 may be configured as or otherwise support a means for determining a sidelink message to transmit to a second UE over a time resource of a sidelink connection between the first UE and the second UE. The encoding manager 730 may be configured as or otherwise support a means for encoding at least a subset of time periods of the time resource according to a configuration that is based on a switching time for the second UE for switching from a receiving mode to a transmitting mode during reception of the sidelink message during at least the subset of time periods of the time resource. The data manager 735 may be configured as or otherwise support a means for transmitting the sidelink message to the second UE using a set of time periods of the time resource that includes the subset of time periods. In some examples, the time resource includes a first sidelink slot. In some examples, the subset of time periods includes one or more orthogonal frequency division multiplexing symbols. In some examples, the time resource includes a first sidelink slot. In some examples, the subset of time periods includes one or more orthogonal frequency division multiplexing symbols.

In some examples, to support encoding at least the subset of time periods of the time resource according to the configuration, the encoding manager 730 may be configured as or otherwise support a means for mapping modulation symbols to resource elements of the subset of time periods according to a comb mapping pattern.

In some examples, to support encoding at least the subset of time periods of the time resource according to the configuration, the encoding manager 730 may be configured as or otherwise support a means for configuring at least the subset of time periods with parity bits, or with repeating binary zeros, or with repeating binary ones, or with a configured sequence of bits.

In some examples, to support encoding at least the subset of time periods of the time resource according to the configuration, the encoding manager 730 may be configured as or otherwise support a means for using a first subcarrier spacing for transmission of at least a first time period of the time resource. In some examples, to support encoding at least the subset of time periods of the time resource according to the configuration, the encoding manager 730 may be configured as or otherwise support a means for using a second subcarrier spacing for transmission of at least the subset of time periods, where the second subcarrier spacing is different from the first subcarrier spacing.

In some examples, the switching manager 755 may be configured as or otherwise support a means for switching from the transmitting mode to the receiving mode during a first portion of a first time period of a second time resource directly subsequent the time resource. In some examples, the data manager 735 may be configured as or otherwise support a means for receiving a transmission during a second portion of the first time period of the second time resource that occurs after the first portion of the first time period of the second time resource.

In some examples, the sidelink manager 725 may be configured as or otherwise support a means for receiving an indication of the configuration from a base station. In some examples, the sidelink manager 725 may be configured as or otherwise support a means for transmitting a message to the second UE that indicates the configuration received from the base station.

Additionally or alternatively, the communications manager 720 may support wireless communication at a second UE in accordance with examples as disclosed herein. The message manager 740 may be configured as or otherwise support a means for determining a sidelink message is to be transmitted from a first UE to the second UE over a time resource. The decoding manager 745 may be configured as or otherwise support a means for decoding at least a subset of time periods of the time resource according to a configuration that is based on a switching time for the second UE for switching from a receiving mode to a transmitting mode during reception of the sidelink message during at least the subset of time periods of the time resource. The configuration manager 750 may be configured as or otherwise support a means for switching from the receiving mode to the transmitting mode during at least the subset of time periods of the time resource to transmit a second sidelink message during a second time resource subsequent to the time resource.

In some examples, to support decoding at least the subset of time periods, the decoding manager 745 may be configured as or otherwise support a means for demapping modulation symbols from resource elements of the subset of time periods according to a comb mapping pattern.

In some examples, to support decoding at least the subset of time periods, the decoding manager 745 may be configured as or otherwise support a means for determining the subset of time periods includes parity bits, or repeating binary zeros, or repeating binary ones, or a configured sequence of bits.

In some examples, to support decoding at least the subset of time periods, the decoding manager 745 may be configured as or otherwise support a means for determining a first subcarrier spacing used for transmission of at least a first time period of the time resource. In some examples, to support decoding at least the subset of time periods, the decoding manager 745 may be configured as or otherwise support a means for determining a second subcarrier spacing used for transmission of at least the subset of time periods, where the second subcarrier spacing is different from the first subcarrier spacing.

In some examples, the configuration manager 750 may be configured as or otherwise support a means for receiving an indication of the configuration from a base station. In some examples, the configuration manager 750 may be configured as or otherwise support a means for receiving a message from the first UE that indicates the configuration.

Figure 8:
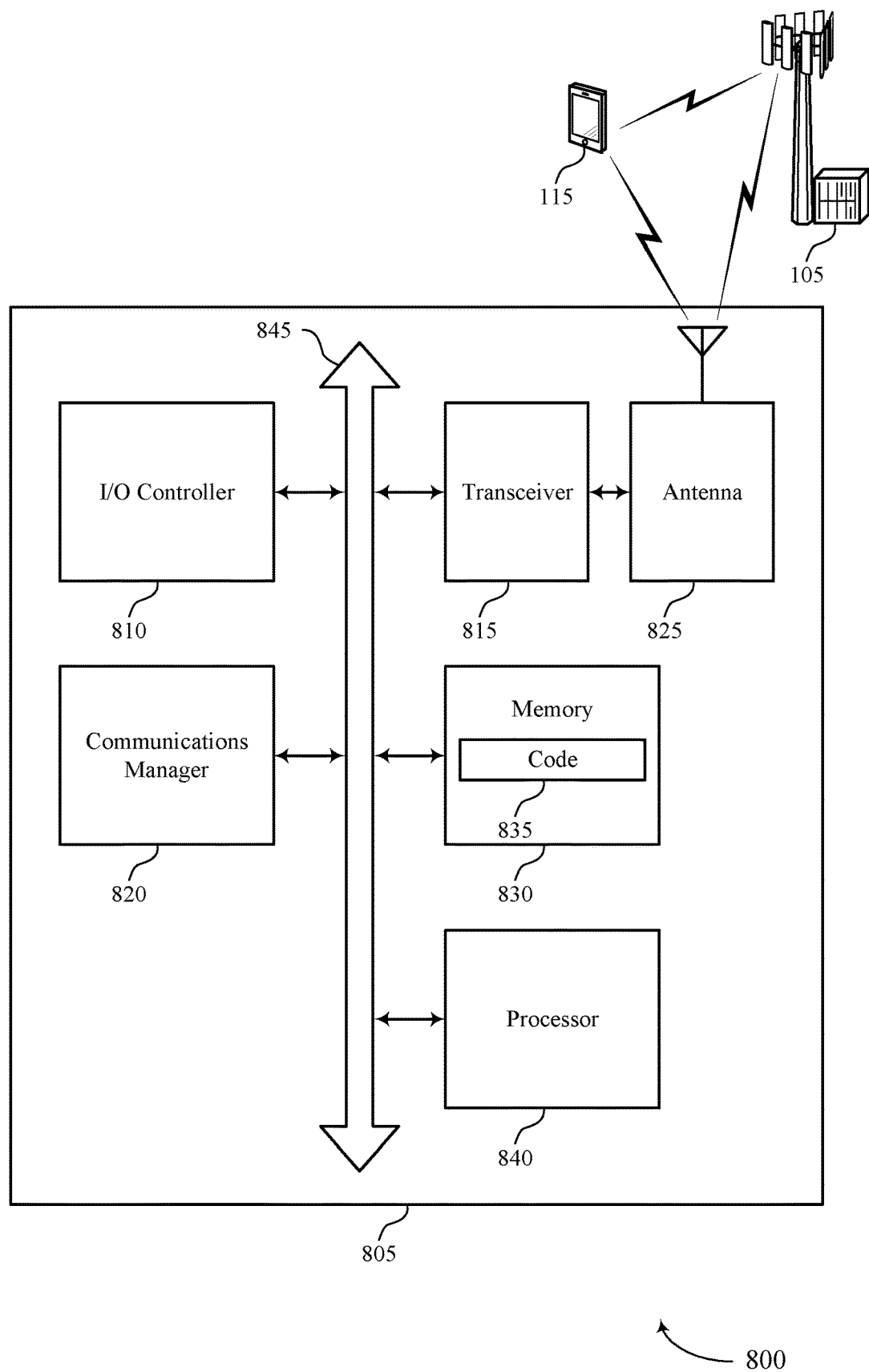
FIG. 8 shows a diagram of a system including a device that supports transmit and receive switching for sidelink communications in accordance with aspects of the present disclosure.

FIG. 8 shows a diagram of a system 800 including a device 805 that supports transmit and receive switching for sidelink communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting transmit and receive switching for sidelink communications). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for determining a sidelink message to transmit to a second UE over a time resource of a sidelink connection between the first UE and the second UE. The communications manager 820 may be configured as or otherwise support a means for encoding at least a subset of time periods of the time resource according to a configuration that is based on a switching time for the second UE for switching from a receiving mode to a transmitting mode during reception of the sidelink message during at least the subset of time periods of the time resource. The communications manager 820 may be configured as or otherwise support a means for transmitting the sidelink message to the second UE using a set of time periods of the time resource that includes the subset of time periods.

Additionally or alternatively, the communications manager 820 may support wireless communication at a second UE in accordance with examples as disclosed herein. For example, the communications manager 820 may be configured as or otherwise support a means for determining a sidelink message is to be transmitted from a first UE to the second UE over a time resource. The communications manager 820 may be configured as or otherwise support a means for decoding at least a subset of time periods of the time resource according to a configuration that is based on a switching time for the second UE for switching from a receiving mode to a transmitting mode during reception of the sidelink message during at least the subset of time periods of the time resource. The communications manager 820 may be configured as or otherwise support a means for switching from the receiving mode to the transmitting mode during at least the subset of time periods of the time resource to transmit a second sidelink message during a second time resource subsequent to the time resource.

By including or configuring the communications manager 820 in accordance with examples as described herein, the device 805 may support techniques avoiding multiple retransmissions and failed transmissions, decreasing system latency, improving the reliability of decoding procedures for uplink transmissions at a base station, and improving user the experience.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of transmit and receive switching for sidelink communications as described herein, or the processor 840 and the memory 830 may be otherwise configured to perform or support such operations.

Figure 9:
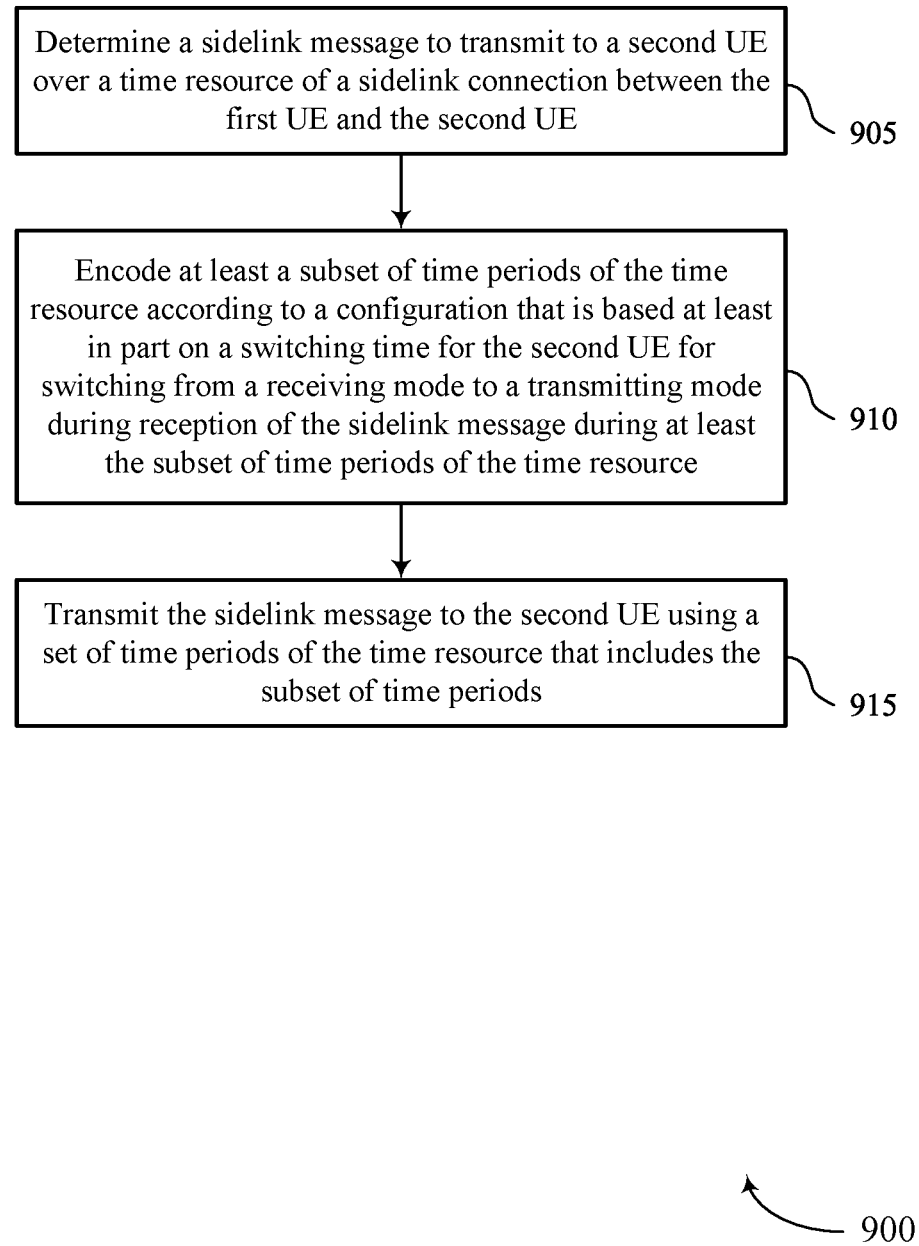
FIGS. 9 through 12 show flowcharts illustrating methods that support transmit and receive switching for sidelink communications in accordance with aspects of the present disclosure.

FIG. 9 shows a flowchart illustrating a method 900 that supports transmit and receive switching for sidelink communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include determining a sidelink message to transmit to a second UE over a time resource of a sidelink connection between the first UE and the second UE. The operations of 905 may be performed in accordance with examples as disclosed herein. In some examples, aspects of the operations of 905 may be performed by a sidelink manager 725 as described with reference to FIG. 7.

At 910, the method may include encoding at least a subset of time periods of the time resource according to a configuration that is based on a switching time for the second UE for switching from a receiving mode to a transmitting mode during reception of the sidelink message during at least the subset of time periods of the time resource. The operations of 910 may be performed in accordance with examples as disclosed herein. In some examples, aspects of the operations of 910 may be performed by an encoding manager 730 as described with reference to FIG. 7.

At 915, the method may include transmitting the sidelink message to the second UE using a set of time periods of the time resource that includes the subset of time periods. The operations of 915 may be performed in accordance with examples as disclosed herein. In some examples, aspects of the operations of 915 may be performed by a data manager 735 as described with reference to FIG. 7.

Figure 10:
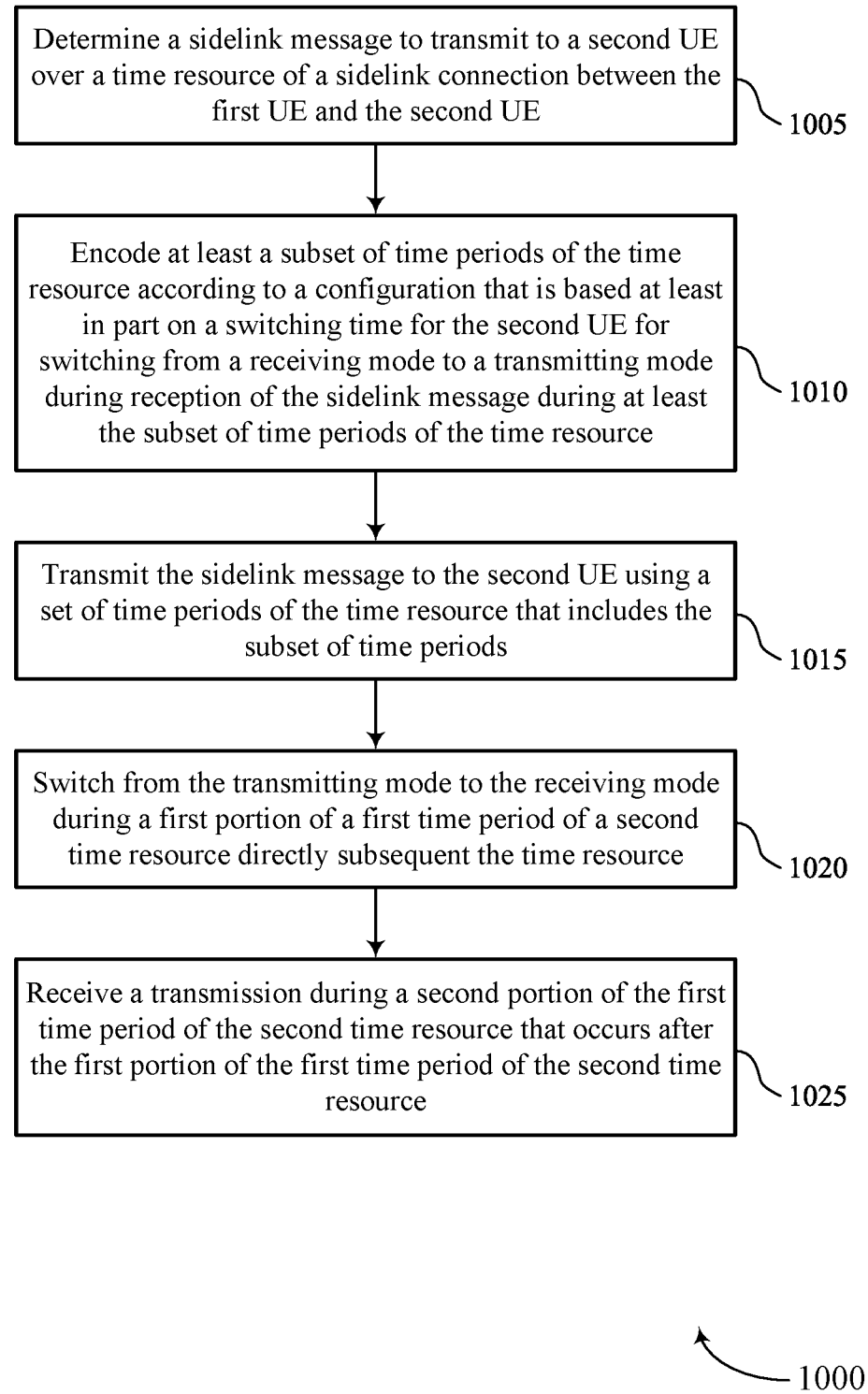

FIG. 10 shows a flowchart illustrating a method 1000 that supports transmit and receive switching for sidelink communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include determining a sidelink message to transmit to a second UE over a time resource of a sidelink connection between the first UE and the second UE. The operations of 1005 may be performed in accordance with examples as disclosed herein. In some examples, aspects of the operations of 1005 may be performed by a sidelink manager 725 as described with reference to FIG. 7.

At 1010, the method may include encoding at least a subset of time periods of the time resource according to a configuration that is based on a switching time for the second UE for switching from a receiving mode to a transmitting mode during reception of the sidelink message during at least the subset of time periods of the time resource. The operations of 1010 may be performed in accordance with examples as disclosed herein. In some examples, aspects of the operations of 1010 may be performed by an encoding manager 730 as described with reference to FIG. 7.

At 1015, the method may include transmitting the sidelink message to the second UE using a set of time periods of the time resource that includes the subset of time periods. The operations of 1015 may be performed in accordance with examples as disclosed herein. In some examples, aspects of the operations of 1015 may be performed by a data manager 735 as described with reference to FIG. 7.

At 1020, the method may include switching from the transmitting mode to the receiving mode during a first portion of a first time period of a second time resource directly subsequent the time resource. The operations of 1020 may be performed in accordance with examples as disclosed herein. In some examples, aspects of the operations of 1020 may be performed by a switching manager 755 as described with reference to FIG. 7.

At 1025, the method may include receiving a transmission during a second portion of the first time period of the second time resource that occurs after the first portion of the first time period of the second time resource. The operations of 1025 may be performed in accordance with examples as disclosed herein. In some examples, aspects of the operations of 1025 may be performed by a data manager 735 as described with reference to FIG. 7.

Figure 11:
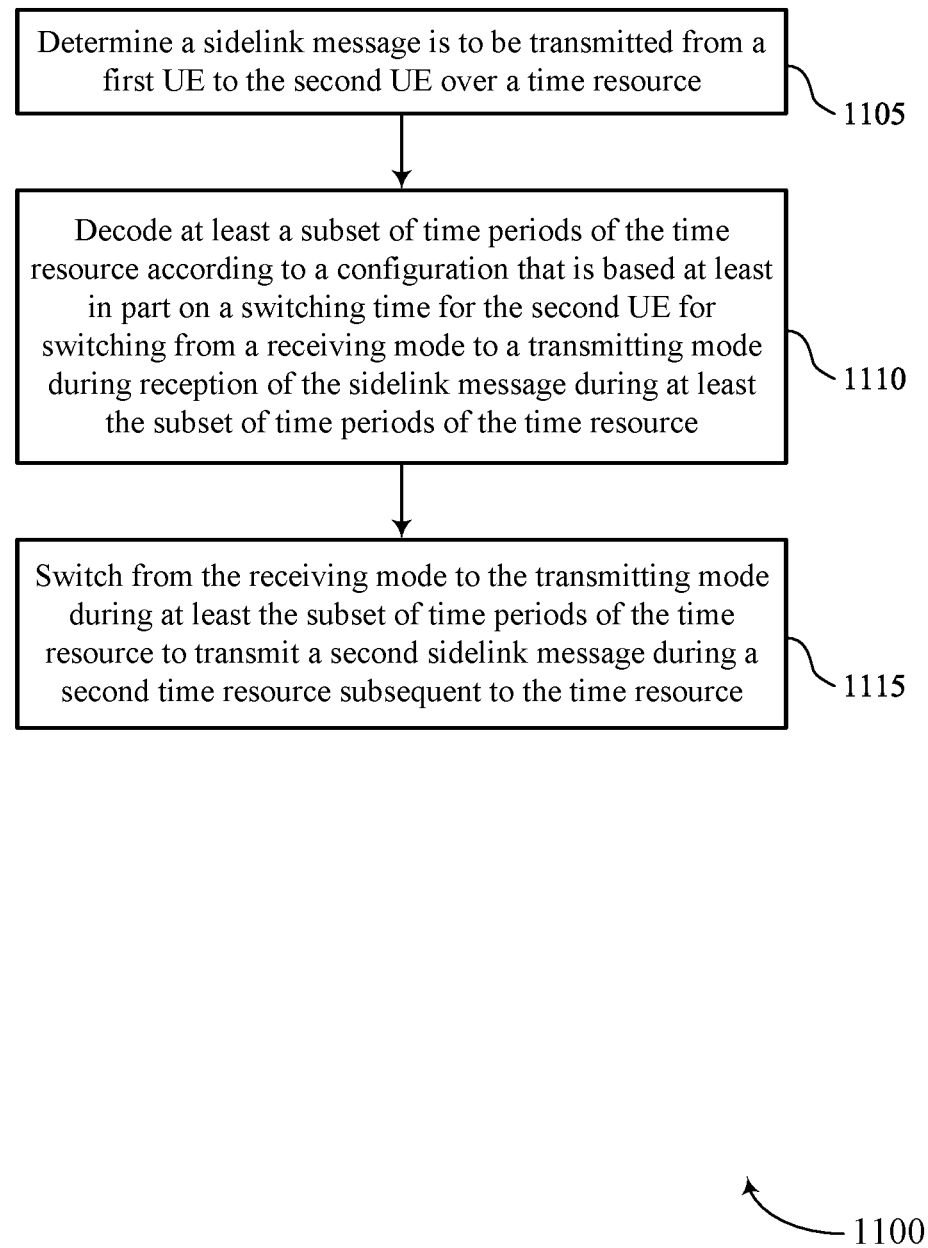

FIG. 11 shows a flowchart illustrating a method 1100 that supports transmit and receive switching for sidelink communications in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include determining a sidelink message is to be transmitted from a first UE to the second UE over a time resource. The operations of 1105 may be performed in accordance with examples as disclosed herein. In some examples, aspects of the operations of 1105 may be performed by a message manager 740 as described with reference to FIG. 7.

At 1110, the method may include decoding at least a subset of time periods of the time resource according to a configuration that is based on a switching time for the second UE for switching from a receiving mode to a transmitting mode during reception of the sidelink message during at least the subset of time periods of the time resource. The operations of 1110 may be performed in accordance with examples as disclosed herein. In some examples, aspects of the operations of 1110 may be performed by a decoding manager 745 as described with reference to FIG. 7.

At 1115, the method may include switching from the receiving mode to the transmitting mode during at least the subset of time periods of the time resource to transmit a second sidelink message during a second time resource subsequent to the time resource. The operations of 1115 may be performed in accordance with examples as disclosed herein. In some examples, aspects of the operations of 1115 may be performed by a configuration manager 750 as described with reference to FIG. 7.

Figure 12:
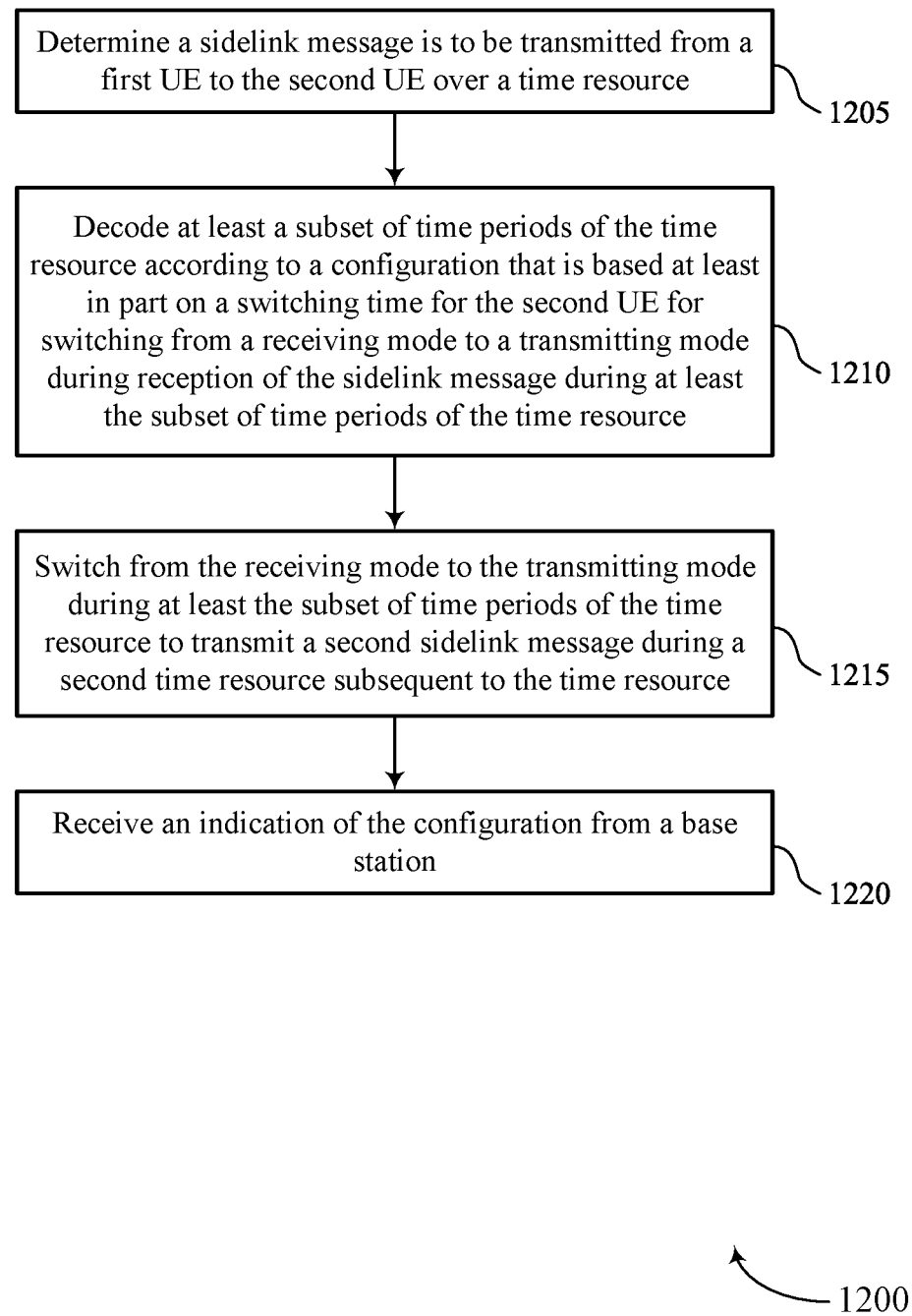

FIG. 12 shows a flowchart illustrating a method 1200 that supports transmit and receive switching for sidelink communications in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include determining a sidelink message is to be transmitted from a first UE to the second UE over a time resource. The operations of 1205 may be performed in accordance with examples as disclosed herein. In some examples, aspects of the operations of 1205 may be performed by a message manager 740 as described with reference to FIG. 7.

At 1210, the method may include decoding at least a subset of time periods of the time resource according to a configuration that is based on a switching time for the second UE for switching from a receiving mode to a transmitting mode during reception of the sidelink message during at least the subset of time periods of the time resource. The operations of 1210 may be performed in accordance with examples as disclosed herein. In some examples, aspects of the operations of 1210 may be performed by a decoding manager 745 as described with reference to FIG. 7.

At 1215, the method may include switching from the receiving mode to the transmitting mode during at least the subset of time periods of the time resource to transmit a second sidelink message during a second time resource subsequent to the time resource. The operations of 1215 may be performed in accordance with examples as disclosed herein. In some examples, aspects of the operations of 1215 may be performed by a configuration manager 750 as described with reference to FIG. 7.

At 1220, the method may include receiving an indication of the configuration from a base station. The operations of 1220 may be performed in accordance with examples as disclosed herein. In some examples, aspects of the operations of 1220 may be performed by a configuration manager 750 as described with reference to FIG. 7.

The following provides an overview of aspects of the present disclosure:

Aspect 1: A method for wireless communication at a first UE, comprising: determining a sidelink message to transmit to a second UE over a time resource of a sidelink connection between the first UE and the second UE; encoding at least a subset of time periods of the time resource according to a configuration that is based at least in part on a switching time for the second UE for switching from a receiving mode to a transmitting mode during reception of the sidelink message during at least the subset of time periods of the time resource; and transmitting the sidelink message to the second UE using a set of time periods of the time resource that includes the subset of time periods.

Aspect 2: The method of aspect 1, wherein encoding at least the subset of time periods of the time resource according to the configuration comprises: mapping modulation symbols to resource elements of the subset of time periods according to a comb mapping pattern.

Aspect 3: The method of any of aspects 1 through 2, wherein encoding at least the subset of time periods of the time resource according to the configuration comprises: configuring at least the subset of time periods with parity bits, or with repeating binary zeros, or with repeating binary ones, or with a configured sequence of bits.

Aspect 4: The method of any of aspects 1 through 3, wherein encoding at least the subset of time periods of the time resource according to the configuration comprises: using a first subcarrier spacing for transmission of at least a first time period of the time resource; and using a second subcarrier spacing for transmission of at least the subset of time periods, wherein the second subcarrier spacing is different from the first subcarrier spacing.

Aspect 5: The method of any of aspects 1 through 4, further comprising: switching from the transmitting mode to the receiving mode during a first portion of a first time period of a second time resource directly subsequent the time resource; and receiving a transmission during a second portion of the first time period of the second time resource that occurs after the first portion of the first time period of the second time resource.

Aspect 6: The method of any of aspects 1 through 5, further comprising: receiving an indication of the configuration from a base station.

Aspect 7: The method of aspect 6, further comprising: transmitting a message to the second UE that indicates the configuration received from the base station.

Aspect 8: The method of any of aspects 1 through 7, wherein the time resource comprises a first sidelink slot, and the subset of time periods comprises one or more orthogonal frequency division multiplexing symbols.

Aspect 9: A method for wireless communication at a second UE, comprising: determining a sidelink message is to be transmitted from a first UE to the second UE over a time resource; decoding at least a subset of time periods of the time resource according to a configuration that is based at least in part on a switching time for the second UE for switching from a receiving mode to a transmitting mode during reception of the sidelink message during at least the subset of time periods of the time resource; and switching from the receiving mode to the transmitting mode during at least the subset of time periods of the time resource to transmit a second sidelink message during a second time resource subsequent to the time resource.

Aspect 10: The method of aspect 9, wherein decoding at least the subset of time periods comprises: demapping modulation symbols from resource elements of the subset of time periods according to a comb mapping pattern.

Aspect 11: The method of any of aspects 9 through 10, wherein decoding at least the subset of time periods comprises: determining the subset of time periods comprises parity bits, or repeating binary zeros, or repeating binary ones, or a configured sequence of bits.

Aspect 12: The method of any of aspects 9 through 11, wherein decoding at least the subset of time periods comprises: determining a first subcarrier spacing used for transmission of at least a first time period of the time resource; and determining a second subcarrier spacing used for transmission of at least the subset of time periods, wherein the second subcarrier spacing is different from the first subcarrier spacing.

Aspect 13: The method of any of aspects 9 through 12, further comprising: receiving an indication of the configuration from a base station.

Aspect 14: The method of any of aspects 9 through 13, further comprising: receiving a message from the first UE that indicates the configuration.

Aspect 15: The method of any of aspects 9 through 14, wherein the time resource comprises a first sidelink slot, and the subset of time periods comprises one or more orthogonal frequency division multiplexing symbols.

Aspect 16: An apparatus for wireless communication at a first UE, comprising a processor; memory coupled with the processor; and instructions stored in the memory and executable by the processor to cause the apparatus to perform a method of any of aspects 1 through 8.

Aspect 17: An apparatus for wireless communication at a first UE, comprising at least one means for performing a method of any of aspects 1 through 8.

Aspect 18: A non-transitory computer-readable medium storing code for wireless communication at a first UE, the code comprising instructions executable by a processor to perform a method of any of aspects 1 through 8.

Aspect 19: An apparatus for wireless communication at a second UE, comprising a processor; memory coupled with the processor; and instructions stored in the memory and executable by the processor to cause the apparatus to perform a method of any of aspects 9 through 15.

Aspect 20: An apparatus for wireless communication at a second UE, comprising at least one means for performing a method of any of aspects 9 through 15.

Aspect 21: A non-transitory computer-readable medium storing code for wireless communication at a second UE, the code comprising instructions executable by a processor to perform a method of any of aspects 9 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   determining a sidelink message to transmit to a second UE over a time resource of a sidelink connection between the first UE and the second UE;
   encoding at least a subset of time periods of the time resource according to a configuration that is based at least in part on a switching time for the second UE for switching from a receiving mode to a transmitting mode during reception of the sidelink message, wherein the switching time for the second UE is during at least the subset of time periods of the time resource that was encoded according to the configuration; and
   transmitting the sidelink message to the second UE using a set of time periods of the time resource that includes the subset of time periods.

2. The method of claim 1, wherein encoding at least the subset of time periods of the time resource according to the configuration comprises:
   mapping modulation symbols to resource elements of the subset of time periods according to a comb mapping pattern.

3. The method of claim 1, wherein encoding at least the subset of time periods of the time resource according to the configuration comprises:
   configuring at least the subset of time periods with parity bits, or with repeating binary zeros, or with repeating binary ones, or with a configured sequence of bits.

4. The method of claim 1, wherein encoding at least the subset of time periods of the time resource according to the configuration comprises:
   using a first subcarrier spacing for transmission of at least a first time period of the time resource; and
   using a second subcarrier spacing for transmission of at least the subset of time periods, wherein the second subcarrier spacing is different from the first subcarrier spacing.

5. The method of claim 1, further comprising:
   switching from the transmitting mode to the receiving mode during a first portion of a first time period of a second time resource directly subsequent the time resource; and
   receiving a transmission during a second portion of the first time period of the second time resource that occurs after the first portion of the first time period of the second time resource.

6. The method of claim 1, further comprising:
   receiving an indication of the configuration from a network device.

7. The method of claim 6, further comprising:
   transmitting a message to the second UE that indicates the configuration received from the network device.

8. The method of claim 1, wherein:
   the time resource comprises a first sidelink slot, and
   the subset of time periods comprises one or more orthogonal frequency division multiplexing symbols.

9. A method for wireless communication at a second user equipment (UE), comprising:
   determining a sidelink message is to be transmitted from a first UE to the second UE over a time resource;
   decoding at least a subset of time periods of the time resource according to a configuration that is based at least in part on a switching time for the second UE for switching from a receiving mode to a transmitting mode during reception of the sidelink message, wherein the switching time for the second UE is during at least the subset of time periods of the time resource that was encoded according to the configuration; and
   switching from the receiving mode to the transmitting mode during at least the subset of time periods of the time resource to transmit a second sidelink message during a second time resource subsequent to the time resource.

10. The method of claim 9, wherein decoding at least the subset of time periods comprises:
    demapping modulation symbols from resource elements of the subset of time periods according to a comb mapping pattern.

11. The method of claim 9, wherein decoding at least the subset of time periods comprises:
    determining the subset of time periods comprises parity bits, or repeating binary zeros, or repeating binary ones, or a configured sequence of bits.

12. The method of claim 9, wherein decoding at least the subset of time periods comprises:
    determining a first subcarrier spacing used for transmission of at least a first time period of the time resource; and
    determining a second subcarrier spacing used for transmission of at least the subset of time periods, wherein the second subcarrier spacing is different from the first subcarrier spacing.

13. The method of claim 9, further comprising:
    receiving an indication of the configuration from a network device.

14. The method of claim 9, further comprising:
receiving a message from the first UE that indicates the configuration.

15. The method of claim 9, wherein the time resource comprises a first sidelink slot, and the subset of time periods comprises one or more orthogonal frequency division multiplexing symbols.

16. An apparatus for wireless communication at a first user equipment (UE), comprising:
a processor;
memory coupled with the processor; and
instructions stored in the memory and executable by the processor to cause the apparatus to:
determine a sidelink message to transmit to a second UE over a time resource of a sidelink connection between the first UE and the second UE;
encode at least a subset of time periods of the time resource according to a configuration that is based at least in part on a switching time for the second UE for switching from a receiving mode to a transmitting mode during reception of the sidelink message, wherein the switching time for the second UE is during at least the subset of time periods of the time resource that was encoded according to the configuration; and
transmit the sidelink message to the second UE using a set of time periods of the time resource that includes the subset of time periods.

17. The apparatus of claim 16, wherein the instructions to encode at least the subset of time periods of the time resource according to the configuration are executable by the processor to cause the apparatus to:
map modulation symbols to resource elements of the subset of time periods according to a comb mapping pattern.

18. The apparatus of claim 16, wherein the instructions to encode at least the subset of time periods of the time resource according to the configuration are executable by the processor to cause the apparatus to:
configure at least the subset of time periods with parity bits, or with repeating binary zeros, or with repeating binary ones, or with a configured sequence of bits.

19. The apparatus of claim 16, wherein the instructions to encode at least the subset of time periods of the time resource according to the configuration are executable by the processor to cause the apparatus to:
use a first subcarrier spacing for transmission of at least a first time period of the time resource; and
use a second subcarrier spacing for transmission of at least the subset of time periods, wherein the second subcarrier spacing is different from the first subcarrier spacing.

20. The apparatus of claim 16, wherein the instructions are further executable by the processor to cause the apparatus to:
switch from the transmitting mode to the receiving mode during a first portion of a first time period of a second time resource directly subsequent the time resource; and
receive a transmission during a second portion of the first time period of the second time resource that occurs after the first portion of the first time period of the second time resource.

21. The apparatus of claim 16, wherein the instructions are further executable by the processor to cause the apparatus to:
receive an indication of the configuration from a network device.

22. The apparatus of claim 21, wherein the instructions are further executable by the processor to cause the apparatus to:
transmit a message to the second UE that indicates the configuration received from the network device.

23. The apparatus of claim 16, wherein:
the time resource comprises a first sidelink slot, and
the subset of time periods comprises one or more orthogonal frequency division multiplexing symbols.

24. An apparatus for wireless communication at a second user equipment (UE), comprising:
a processor;
memory coupled with the processor; and
instructions stored in the memory and executable by the processor to cause the apparatus to:
determine a sidelink message is to be transmitted from a first UE to the second UE over a time resource;
decode at least a subset of time periods of the time resource according to a configuration that is based at least in part on a switching time for the second UE for switching from a receiving mode to a transmitting mode during reception of the sidelink message, wherein the switching time for the second UE is during at least the subset of time periods of the time resource that was encoded according to the configuration; and
switch from the receiving mode to the transmitting mode during at least the subset of time periods of the time resource to transmit a second sidelink message during a second time resource subsequent to the time resource.

25. The apparatus of claim 24, wherein the instructions to decode at least the subset of time periods are executable by the processor to cause the apparatus to:
demap modulation symbols from resource elements of the subset of time periods according to a comb mapping pattern.

26. The apparatus of claim 24, wherein the instructions to decode at least the subset of time periods are executable by the processor to cause the apparatus to:
determine the subset of time periods comprises parity bits, or repeating binary zeros, or repeating binary ones, or a configured sequence of bits.

27. The apparatus of claim 24, wherein the instructions to decode at least the subset of time periods are executable by the processor to cause the apparatus to:
determine a first subcarrier spacing used for transmission of at least a first time period of the time resource; and
determine a second subcarrier spacing used for transmission of at least the subset of time periods, wherein the second subcarrier spacing is different from the first subcarrier spacing.

28. The apparatus of claim 24, wherein the instructions are further executable by the processor to cause the apparatus to:
receive an indication of the configuration from a network device.

29. The apparatus of claim 24, wherein the instructions are further executable by the processor to cause the apparatus to:
receive a message from the first UE that indicates the configuration.

30. The apparatus of claim 24, wherein:
the time resource comprises a first sidelink slot, and the subset of time periods comprises one or more orthogonal frequency division multiplexing symbols.

\* \* \* \* \*